(12) United States Patent
Lee et al.

(10) Patent No.: US 9,778,076 B2
(45) Date of Patent: Oct. 3, 2017

(54) PROXIMITY SENSOR HAVING AN OPTICAL ROUTING MODULE FOR GUIDING EMITTED LIGHT AND TARGET-REFLECTED LIGHT

(71) Applicant: BlackBerry Limited, Waterloo (CA)

(72) Inventors: Hsin Chin Lee, Richmond (CA); Antanas Matthew Broga, Cambridge (CA); Yu Gao, Waterloo (CA)

(73) Assignee: BlackBerry Limited, Waterloo (CA)

( * ) Notice: Subject to any disclaimer, the term of this patent is extended or adjusted under 35 U.S.C. 154(b) by 168 days.

(21) Appl. No.: 14/935,810

(22) Filed: Nov. 9, 2015

(65) Prior Publication Data
US 2016/0138944 A1    May 19, 2016

(30) Foreign Application Priority Data

Nov. 18, 2014 (CA) ..................... 2871628

(51) Int. Cl.
*G06F 3/042* (2006.01)
*G01D 5/34* (2006.01)
(Continued)

(52) U.S. Cl.
CPC .............. *G01D 5/34* (2013.01); *G01S 7/4811* (2013.01); *G01S 17/026* (2013.01); *G06F 3/041* (2013.01)

(58) Field of Classification Search
CPC ...... G06F 3/0488; G06F 1/3231; G06F 3/035; G06F 3/041; G06F 3/0421; H04M 2250/22
(Continued)

(56) References Cited

U.S. PATENT DOCUMENTS 5,302,835 A    4/1994  Bendett et al.
7,160,034 B2   1/2007  Nishie et al.
(Continued)

FOREIGN PATENT DOCUMENTS

DE    102008056071    5/2010

OTHER PUBLICATIONS

Sensopart, Photoelectric sensors and proximity sensors, System description p. 222-225, www.sensopart.com, retrieved May 29, 2014.

(Continued)

*Primary Examiner* — Que T Le
(74) *Attorney, Agent, or Firm* — Integral IP; Miriam Paton; Amy Scouten

(57) ABSTRACT

A proximity sensor for an electronic device comprises a proximity module, a lens and an optical module secured in an air gap therebetween. The proximity module has an emitter and a detector and is configured to generate a signal that is a function of light emitted by the emitter, and light detected by the detector, some portion of the detected light having been reflected by a target external to the electronic device. A transmissive-reflective surface of the optical module is aligned with the emitter field of view (FOV) and the detector FOV. The optical module guides emitted light through a transmissive portion of the lens to the exterior of the electronic device, and guides target-reflected light collected by the transmissive portion to the detector. The emitter FOV and the detector FOV are substantially aligned with one another.

25 Claims, 8 Drawing Sheets

(51) Int. Cl.
*G06F 3/041* (2006.01)
*G01S 17/02* (2006.01)
*G01S 7/481* (2006.01)

(58) Field of Classification Search
USPC .......................................... 250/221, 227.25
See application file for complete search history.

(56) References Cited

U.S. PATENT DOCUMENTS

| | | | |
|---|---|---|---|
| 7,672,049 B2 | 3/2010 | Fruhmann et al. | |
| 8,839,526 B2 | 9/2014 | Hinderling et al. | |
| 8,912,480 B2 * | 12/2014 | Pope .................... | G01J 1/0422 250/221 |
| 2013/0181131 A1 | 7/2013 | Holenarsipur | |

OTHER PUBLICATIONS

Bordovsky, Second Office Action for CA2,871,628, mailed May 24, 2017.
Lopez De Valle, Extended European Search Report for EP15193886.7 Apr. 18, 2016.
Bordovsky, First Office Action for CA2871628 Jun. 14, 2016.

* cited by examiner

PROXIMITY SENSOR HAVING AN OPTICAL ROUTING MODULE FOR GUIDING EMITTED LIGHT AND TARGET-REFLECTED LIGHT

TECHNICAL FIELD

The technology described herein relates generally to proximity sensors, and specifically to optical proximity sensors for use in electronic devices.

BACKGROUND

A proximity sensor is a sensor that is able to sense the presence of a nearby object without requiring any physical contact with that object. An object to be sensed by a proximity sensor is typically referred to as a target. In one example, an electronic device may comprise a proximity sensor that is able to sense the presence of a user's skin, and the electronic device may be configured to adjust certain behaviours or processes dependent on an output of the proximity sensor. For example, where the electronic device is a mobile telephone with a touch screen, the proximity sensor may be positioned such that it is able to sense the presence of the user's skin when the user is making a voice call (i.e., when the mobile telephone is oriented with the speaker close to the user's ear, and the microphone close to the user's mouth). Responsive to the proximity sensor sensing the presence of the user's skin, the mobile telephone may be configured to deactivate the touch screen. In this manner, the proximity sensor may be used to conserve power and to prevent inadvertent activation of the touch screen during a voice call.

A proximity sensor typically comprises an emitter and a detector. The emitter emits electromagnetic radiation or light, such as infrared (IR) light, over a region which will herein be referred to as the emitter field of view (FOV). The detector detects light over a region which will herein be referred to as the detector FOV. When light emitted by the emitter is incident on a target, the light may be reflected by the target in such a manner that the target-reflected light is incident on the detector within the detector FOV, and therefore able to be detected.

There may exist a region close to the proximity sensor where the emitter FOV does not overlap with the detector FOV. This region will herein be referred to as the blind zone. Depending on the specific emitter and detector used, as well as their optical configuration within the electronic device, it may be impossible for the proximity sensor to sense a target that is located within the blind zone.

Ideally, the emitter and the detector would be isolated from one another such that the only light detectable by the detector is light external to the proximity sensor (e.g., light reflected from a target and any ambient light external to the electronic device comprising the proximity sensor). However, in practice, the detector also detects some of the light, emitted by the emitter, that has not reached the exterior of the electronic device. This undesirable contribution will herein be referred to as crosstalk. Crosstalk arises when light emitted by the emitter is internally reflected off of various surfaces within the electronic device and is detected by the detector without having ever left the electronic device. Crosstalk contributes to noise. More crosstalk results in a proximity sensor with a lower signal to noise ratio.

Sometimes the intensity of the light reflected off of a target is too low, relative to the noise, to be detected by the detector. This may occur, for example, when the target is too far away from the proximity sensor, or when the target comprises a material having a low reflectance. For example, the reflectance of light off of black felt or black hair may be lower than the reflectance of light off of other targets. If the intensity of the reflected light is too low, relative to the noise, then the proximity sensor may be unable to sense the presence of the target. In addition, as described previously, when the target is too close to the proximity sensor, the target may be located within the blind zone such that the presence of the target goes undetected by the proximity sensor. These and other limitations of the proximity sensor may depend on the specific emitter and detector used, as well as their optical configuration within the electronic device.

SUMMARY

According to one example, there is disclosed a proximity sensor for an electronic device. The electronic device comprises a host processor enclosed within a housing. A touch screen may be coupled to the host processor. The proximity sensor is coupled to the host processor. The proximity sensor comprises a proximity module having an emitter to emit light in an emitter field of view (FOV) and a detector to detect light in a detector FOV. The proximity module is configured to generate a signal that is a function of the emitted light and of the light incident on the detector in the detector FOV, where the signal is indicative of the presence of a target external to the electronic device. The proximity sensor further comprises a lens separated from the proximity module by an air gap, where the lens has (i) a transmissive portion in alignment with the emitter FOV and with the detector FOV, and (ii) a non-transmissive portion that extends over an area that is opposite the detector. The proximity sensor further comprises an optical routing module secured within the air gap. The optical routing module comprises a transmissive-reflective surface in alignment with the emitter FOV, with the detector FOV, and with the transmissive portion of the lens. The transmissive-reflective surface is oriented at an angle of approximately 45°±10° with respect to the emitter FOV. The optical routing module is configured to guide the emitted light transmitted by the transmissive-reflective surface through the transmissive portion of the lens to the exterior of the electronic device. The optical routing module is further configured to guide target-reflected light collected by the transmissive portion of the lens to the detector by reflecting the target-reflected light using the transmissive-reflective surface, where the target-reflected light has been reflected by the target external to the electronic device.

According to another example, there is disclosed a method implemented in an electronic device comprising a proximity sensor, where the proximity sensor comprises (i) a proximity module having an emitter to emit light in an emitter field of view (FOV) and a detector to detect light in a detector FOV, (ii) a lens separated from the proximity module by an air gap, and (iii) an optical routing module secured within the air gap. The method comprises emitting light from the emitter onto a transmissive-reflective surface of the optical routing module, where the transmissive-reflective surface is in alignment with the emitter FOV and with the detector FOV, and where the transmissive-reflective surface is oriented at an angle of approximately 45°±10° with respect to the emitter FOV. The method further comprises guiding the emitted light transmitted by the transmissive-reflective surface to the exterior of the electronic device through a transmissive portion of the lens, where the transmissive portion is in alignment with the emitter FOV and with the detector FOV, and where the lens further comprises a non-transmissive portion that extends over an area that is opposite the detector. The method further comprises guiding target-reflected light received collected by the transmissive portion of the lens to the detector by reflecting the target-reflected light using the transmissive-reflective surface, where the target-reflected light has been reflected by a target external to the electronic device. The method further comprises detecting the target-reflected light incident on the detector within the detector FOV, and generating, at the proximity module, a signal indicative of the presence of the target, wherein the signal is a function of the emitted light and the detected light.

BRIEF DESCRIPTION OF THE DRAWINGS

In the figures of the accompanying drawings, like reference numerals indicate corresponding, analogous or similar elements. For simplicity and clarity of illustration, elements shown in the figures have not necessarily been drawn to scale. For example, the dimensions of some of the elements may be exaggerated relative to other elements for clarity.

DETAILED DESCRIPTION

Figure 1:
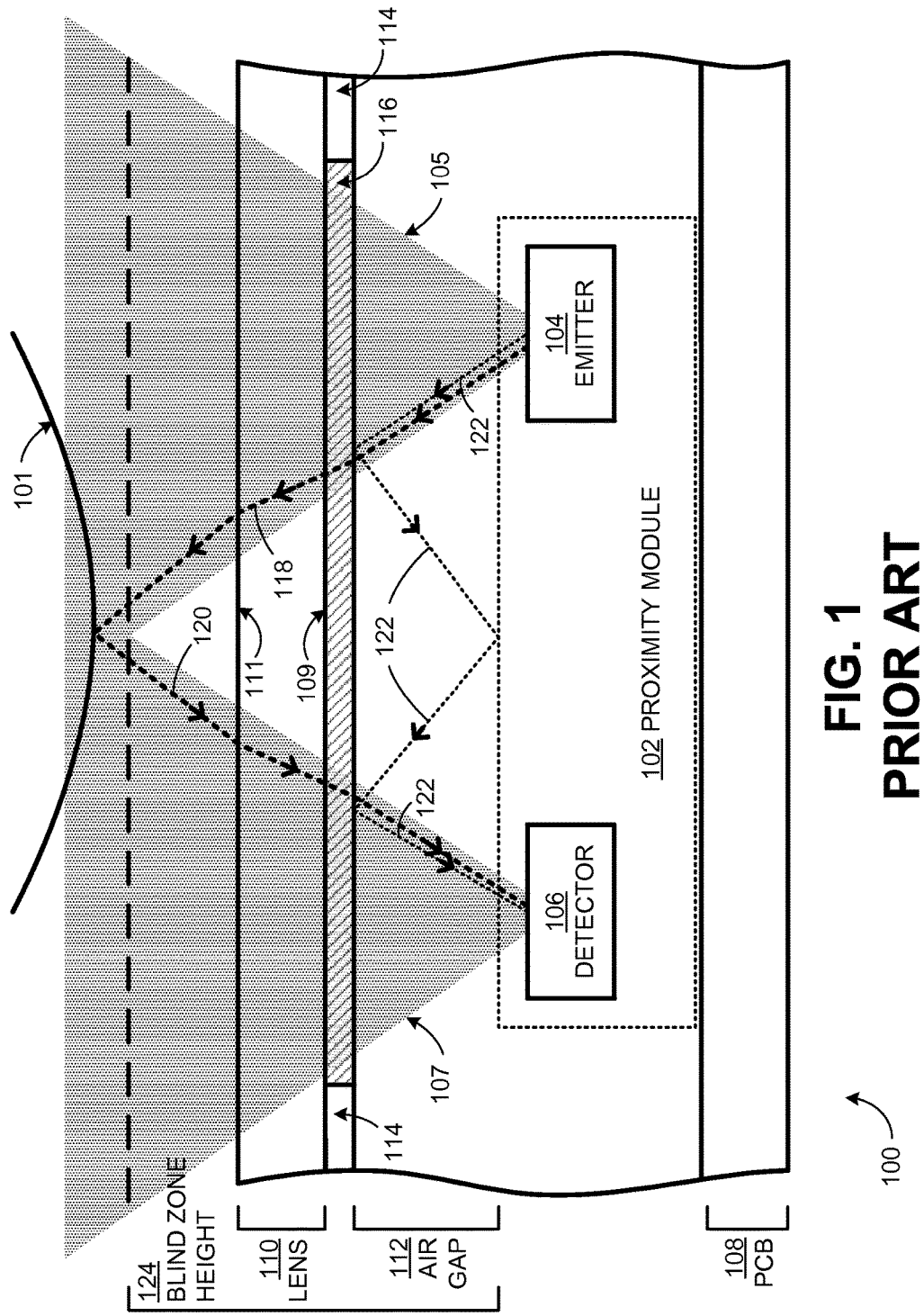
FIG. 1 is a schematic cross-sectional view of a portion of an electronic device comprising a prior art proximity sensor.

The operation of a prior art proximity sensor may be better understood with reference to FIG. 1, which illustrates a schematic cross-sectional view of a portion of an electronic device 100 comprising a proximity module 102. The combination of the proximity module 102 and any optical elements involved in the transmission of light between the proximity module 102 and a target 101 to be sensed will herein be referred to the "prior art proximity sensor".

The proximity module 102 comprises an emitter 104 to emit electromagnetic radiation or light in a region referred to as the emitter field of view (FOV) 105. The emitter FOV 105 may have a value, for example, of between 10° and 25°. In one example, the light may have a wavelength within the infrared (IR) spectrum or the visible spectrum. The proximity module 102 also comprises a detector 106 to detect light incident on the detector 106 in a region referred to as the detector FOV 107. The detector FOV 107 may have a value, for example, between 40° and 120°. The proximity module 102 may comprise hardware and/or software components that control the emission of light by the emitter 104, and that enable the proximity module 102 to generate a signal that is a function of the light detected by the detector 106. The proximity module 102 may be a self-contained component, or may comprise multiple interconnected components. In one example, the proximity module 102 is an APDS-9130 Digital Proximity Sensor (AVAGO Technologies). The proximity module 102 may be affixed to a printed circuit board (PCB) 108 of the electronic device 100, for example, by a mechanical connector or by soldering. The signal generated by the proximity module 102 is transmissible to a host processor (not shown) of the electronic device 100, for example, by a wired connection between the proximity module 102 and the host processor.

The electronic device 100 may comprise a lens 110. In one example, the lens 110 comprises glass having a refractive index of n=1.53. In another example, the lens 110 comprises poly(methyl methacrylate) (PMMA) having a refractive index of n=1.49. In yet another example, the lens 110 comprises a polycarbonate having a refractive index of n=1.58. In certain examples, the lens 110 may be flat, and in other examples, the lens 110 may be curved. The lens 110 has an internal surface 109 that faces the internal components of the device, such as the proximity module 102, and an external surface 111 that faces the exterior of the electronic device 100.

The lens 110 may be separated from the proximity module 102 by an air gap 112.

One or more materials may have been applied to the internal surface 109 of the lens 110. For example, a coating 114 of a particular colour, such as white or black, may have been applied to a portion of the internal surface 109 of the lens 110 in order to provide the electronic device 100 with the overall appearance of that particular colour. The coating 114 may comprise one or more layers or printings of ink, such as white ink. The ink may limit or prevent the transmission of light over a range of wavelengths, including, for example, wavelengths in the IR spectrum, or the visible spectrum, or both.

In order for the proximity module 102 to be able to sense the presence of the target 101, at least some portion of the lens 110 must permit at least some portion of the light emitted by the emitter 104 to exit the electronic device 100. Similarly, at least some portion of the lens 110 must permit at least some portion of the light reflected by the target 101 to be detected by the detector 106. In the prior art proximity sensor of FIG. 1, this is achieved by omitting the coating 114 from the portion of the internal surface 109 of the lens 110 that extends over an area that is opposite both the emitter 104 and the detector 106. In place of the coating 114, the internal surface 109 may be coated with a different coating 116 that permits the transmission of light. In one example, the coating 116 comprises one or more layers or printings of IR-transmissible ink, such that the coating 116 preferentially transmits light in the IR spectrum over light in the visible spectrum. For example, the coating 116 may be 5% transmissible in the visible range, and 95% transmissible in the IR range.

In order to distinguish their relative transmissive properties with respect to the light emitted by the emitter 104, the coating 114 and the coating 116 will herein be referred to as "the non-transmissive coating 114" and "the transmissive coating 116", respectively.

In operation, the emitter 104 may emit a light beam 118 within the emitter FOV 105 such that the light beam 118 is transmitted through the lens 110, via the transmissive coating 116, and is incident on the target 101. Responsive to the incidence of the light beam 118 on the target 101, a light beam 120 may be reflected by the target 101 in such a manner that it is within the detector FOV 107. The light beam 120 may be transmitted through the lens 110, via the transmissive coating 116, and incident on the detector 106 within the detector FOV 107, thereby allowing detection of the light beam 120.

Responsive to detecting the light beam 120, the proximity module 102 may generate a signal indicative of the presence of a target proximal to the lens 110 or of the proximity of a target relative to the lens 110, that is, a signal indicative of how close the target is to the lens 110. Such a signal may take a variety of different forms. In one example, the signal is an analog signal having an amplitude or a frequency that is dependent on the presence of the target or the proximity of the target or both. For example, the analog signal may alternate between a maximum amplitude and a minimum amplitude, depending on whether or not a target is detected. Alternatively, the amplitude of the analog signal may increase as the intensity of the light detected by the detector 106 increases in response to an increase in the proximity of the target to the lens 110. In another example, the proximity module 102 may comprise an analog-to-digital converter, such that the signal output by proximity module 102 is a digital signal having a value that is dependent on the presence of the target or the proximity of the target or both. Alternatively, where the signal output by the proximity module 102 is analog, the electronic device 100 may comprise a separate analog-to-digital converter that subsequently performs digital conversion on the output analog signal.

Depending on the signal generated by the proximity module 102, the electronic device 100 may modify one or more of its behaviours or processes. For example, in the event that an analog signal generated by the proximity module 102 switches from a minimum amplitude to a maximum amplitude, where the maximum amplitude is indicative of the presence of a target proximal to the lens 110, a processor of the electronic device 100 may be configured to deactivate a touch screen (not shown) of the electronic device 100. Deactivation of the touch screen may involve turning off the display of the touch screen, thus saving power, and turning off the touch panel so that touching the panel has no effect and does not cause inadvertent activation. In the event that the analog signal generated by the proximity module 102 switches from the maximum amplitude to the minimum amplitude, the processor may be configured to reactivate the touch screen, for example, turning on the display of the touch screen and turning on the touch panel. In another example, the volume of a speaker, or which speaker is used to transmit audio, may be modified depending on the signal generated by the proximity module 102. In a further example, if the signal generated by the proximity module 102 is indicative of the electronic device 100 being held in front of and closer to a human face, the image on the display may be zoomed out so as to show more of the image and to display any text in a smaller size; if the signal is indicative of the electronic device 100 being held in front of and farther from the human face, the image on the display may be zoomed in so as to show less of the image and to display any text in a larger size.

In addition to the light beams that are transmitted through the lens 110, such as the light beam 118, the emitter 104 may emit other light beams that are internally reflected off of one or more surfaces within the electronic device 100. For example, the emitter 104 may emit a light beam 122 that is reflected back and forth within the air gap 112, between the internal surface 109 of the lens 110 and the proximity module 102, until it is incident on the detector 106 within the detector FOV 107. Similarly, although not explicitly illustrated in FIG. 1, light beams may also be internally reflected off of the external surface 111 of the lens 110. When these internally reflected light beams, collectively referred to as crosstalk, are detected by the detector 106, they contribute to noise that may impede the sensing of a target. Depending on the intensity of the target-reflected light relative to the intensity of the noise, the proximity sensor may be unable to sense the presence of the target. For example, if the target 101 is too far away from the lens 110, the intensity of the reflected light beam 120 may be so low that the detector 106 is unable to distinguish the reflected light beam 120 from crosstalk 122, and the target 101 may go undetected. In another example, if the target 101 comprises a material of low reflectance, such as black felt or black hair, the detector 106 may also be unable to distinguish a target-reflected light beam from crosstalk.

As previously described, the emitter FOV 105 is the region in which the emitter 104 emits light, while the detector FOV 107 is the region in which the detector 106 detects light. The emitter FOV 105 and the detector FOV 107 of the prior art proximity sensor are not aligned. Instead, the detector FOV 107 is laterally offset from the emitter FOV 105, such that a portion of the detector FOV 107 overlaps a portion of the emitter FOV 105. A target may be sensed when it is located in a region of overlap between the emitter FOV 105 and the detector FOV 107. However, a target located in a different region may not be sensed by the proximity sensor. Depending on the sizes of the emitter FOV 105 and the detector FOV 107 and their respective locations relative to one another and relative to the lens 110, there may exist a blind zone that extends beyond the external surface 111 of the lens 110. The height of the blind zone is denoted by 124 in FIG. 1. The proximity sensor may be unable to sense an external target when the target is sufficiently close to the external surface 111 of the lens such that it is located within the blind zone. For example, when the electronic device 100 is a mobile telephone, and the mobile telephone 100 is positioned against the user's head during a voice call, the proximity sensor may be unable to sense the presence of the head. Consequently, the mobile telephone 100 may not be prompted to modify its behaviour in the expected manner. For example, the touch screen of the mobile telephone 100 may continue to be activated, despite the fact that user is making a voice call, which may result in unnecessary power loss and/or unwanted activation of the touch screen.

Figure 2:
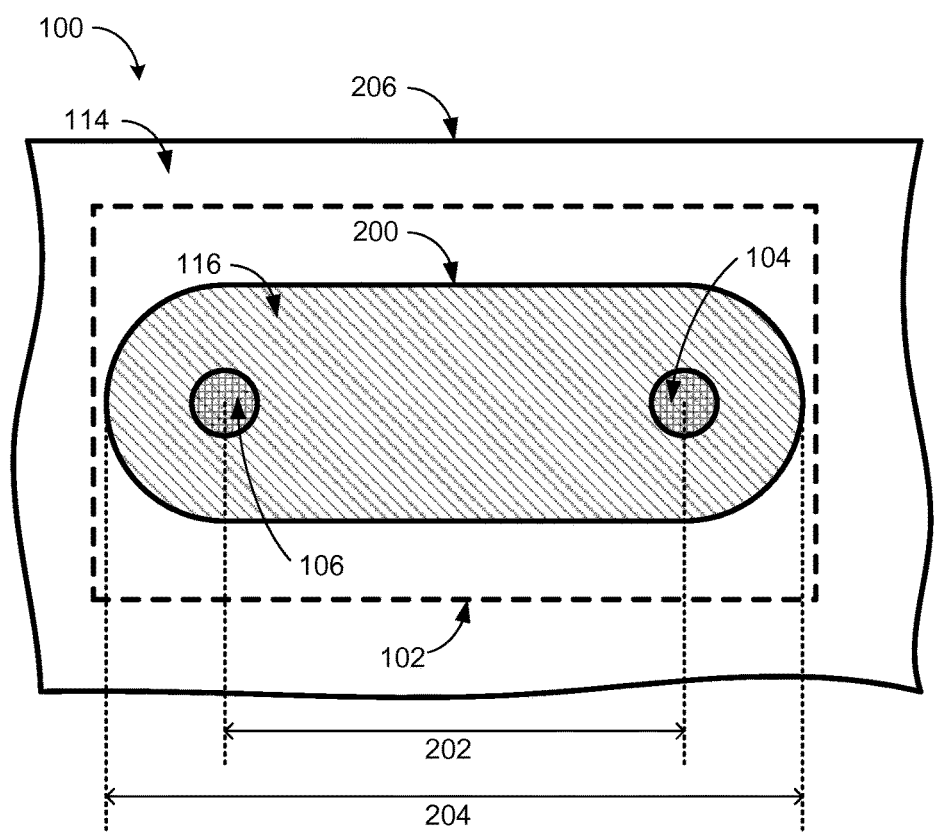
FIG. 2 is a schematic top plan view of a portion of the electronic device illustrated in FIG. 1.

FIG. 2 is a schematic top plan view of a portion of the electronic device 100. As previously described, the portion of the internal surface 109 of the lens 110 that extends over an area that is opposite both the emitter 104 and the detector 106 of the proximity module 102 may be coated in the transmissive coating 116. This portion, defined as the transmissive portion 200, permits at least some portion of the light emitted by the emitter 104 to be transmitted to the exterior of the electronic device 100, and permits at least some portion of the target-reflected light to be transmitted to the interior of the electronic device 100 for detection by the detector 106. Other portions of the internal surface 109 that do not correspond to the transmissive portion 200 may be coated in the non-transmissive coating 114. That is, the non-transmissive coating 114 may be applied to a portion of the internal surface 109 that extends over an area that is not opposite the emitter 104 or the detector 106. The application of the non-transmissive coating 114 may provide the electronic device 100 with the overall appearance of a particular colour, such as black or white. The portion of the internal surface 109 to which the non-transmissive coating 114 is applied, defined as the non-transmissive portion 206, may limit or prevent the transmission of light, including light emitted by the emitter 104, target-reflected light and external ambient light. The transmissive portion 200 of the lens 110 may be bounded by the non-transmissive portion 206 of the lens 110.

In the prior art proximity sensor of FIG. 2, the transmissive portion 200 is an aperture having a substantially oblong shape that extends over an area that is opposite both the emitter 104 and the detector 106. In one example, where the emitter 104 and the detector 106 are separated by a distance 202 of approximately 3.32 mm, the length 204 of the transmissive portion 200 is approximately 5 mm.

In some cases, there may be a significant difference between the relative visual appearances of the transmissive portion 200 and the non-transmissive portion 206. For example, the non-transmissive coating 114 may comprise white ink, thereby providing the non-transmissive portion 206 with a white appearance. In contrast, the transmissive coating 116 may comprise IR-transmissible ink, which is almost black in appearance, thereby providing the transmissive portion 200 with a substantially black appearance. This would result in a significant visual contrast between the transmissive portion 200 and the adjacent non-transmissive portion 206. Where such a contrast exists between the appearance of the transmissive portion 200 and the non-transmissive portion 206, for aesthetic reasons it may be of interest to reduce the size of the transmissive portion 200.

Examples of proximity sensors proposed to address one or more disadvantages of the prior art will be now be described.

Figure 3:
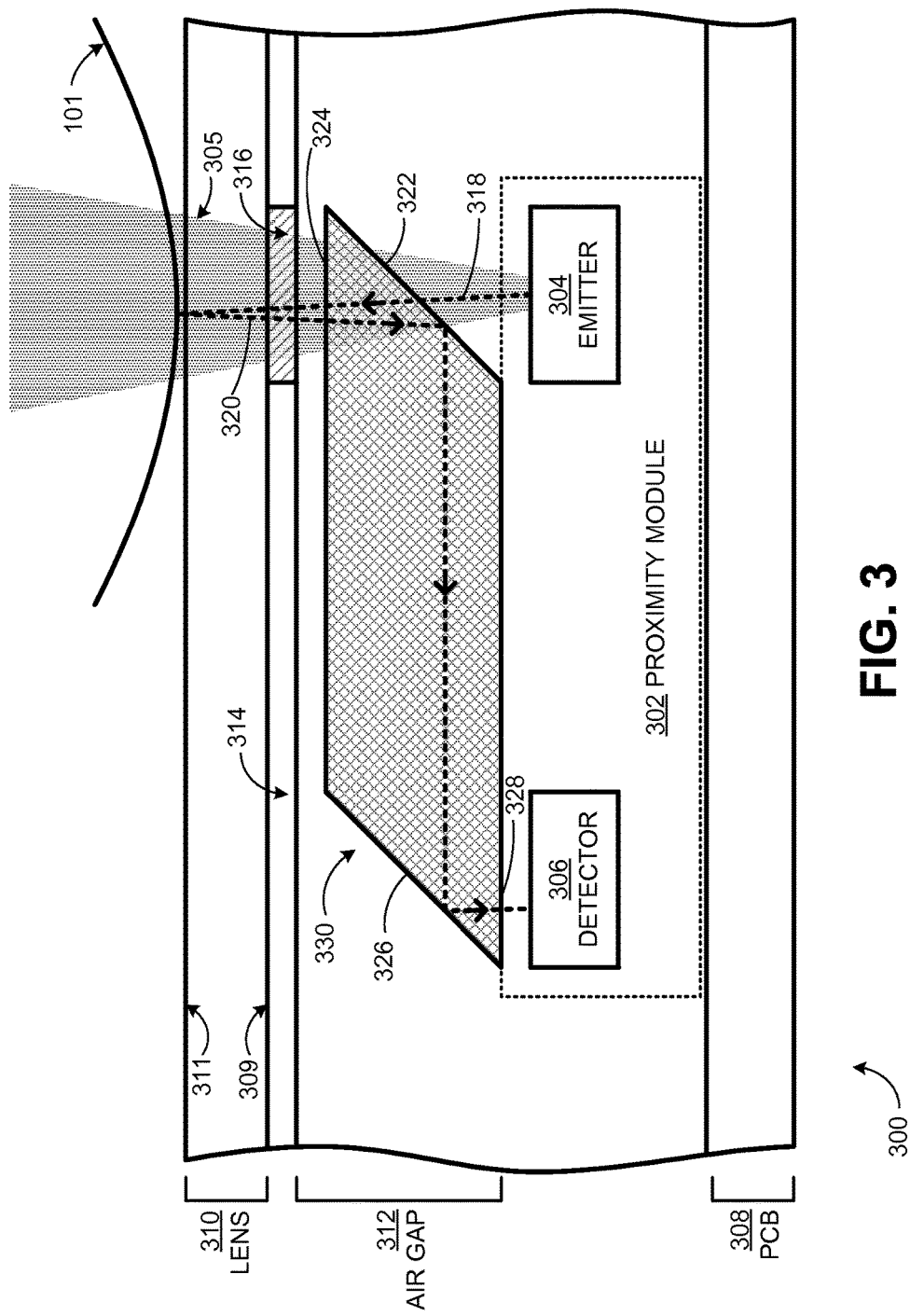
FIG. 3 is a schematic cross-sectional view of a portion of an electronic device comprising a first example proximity sensor.

The operation of a first example proximity sensor according to the proposed technology may be better understood with reference to FIG. 3, which illustrates a schematic cross-sectional view of a portion of an electronic device 300 comprising a proximity module 302. When referring to the example of FIG. 3, the combination of the proximity module 302 and any optical elements involved in the transmission of light between the proximity module 302 and a target 101 to be sensed will herein be referred to the "first example proximity sensor".

The proximity module 302 comprises an emitter 304 to emit electromagnetic radiation or light in a region referred to as the emitter FOV 305. In one example, the emitter 304 is a laser and the emitter FOV 305 may be narrower than the emitter FOV 105 of the prior art proximity sensor illustrated in FIG. 1. For example, where the emitter 304 is a laser, the emitter FOV 305 may be between 2° and 25°. The light emitted from the emitter 304 may have a wavelength within the IR spectrum, for example, between 850 nm and 950 nm. In another example, the light emitted from the emitter 304 may have a wavelength within the visible spectrum. The proximity module 302 also comprises a detector 306 to detect light in a region referred to as the detector FOV. As will be described in more detail later, the detector FOV is redirected within the proximity module 302 such that it is substantially aligned with the emitter FOV 305. Similarly to the proximity module 102, the proximity module 302 may comprise hardware and/or software components that control the emission of light by the emitter 304, and that enable the proximity module 302 to generate a signal that is a function of the light detected by the detector 306. The proximity module 302 may be a self-contained component, or may comprise multiple interconnected components. In one example, the proximity module 302 is an APDS-9130 Digital Proximity Sensor (AVAGO Technologies). The proximity module 302 may be affixed to a PCB 308 of the electronic device 300, for example, by a mechanical connector or by soldering. The signal generated by the proximity module 302 is transmissible to a host processor (not shown) the electronic device 300, for example, by a wired connection between the proximity module 302 and the host processor.

The electronic device 300 comprises a lens 310. In one example, the lens 310 comprises glass having a refractive index of n=1.53. In another example, the lens 310 comprises PMMA having a refractive index of n=1.49. In yet another example, the lens 310 comprises a polycarbonate having a refractive index of n=1.58. In certain examples, the lens 310 may be flat, and in other examples, the lens 310 may be curved. The lens 310 has an internal surface 309 that faces the internal components of the electronic device 300, such as the proximity module 302, and an external surface 311 that faces the exterior of the electronic device 300.

The lens 310 may be separated from the proximity module 302 by an air gap 312. In one example, the air gap 312 is approximately 0.8 mm thick.

One or more materials may have been applied to the internal surface 309 of the lens 310. For example, a coating 314 of a particular colour, such as white or black, may have been applied to a portion of the internal surface 309 of the lens 310 in order to provide the electronic device 300 with the overall appearance of that particular colour. The coating 314 may comprise one or more layers or printings of ink, such as white ink. The ink may limit or prevent the transmission of light over a range of wavelengths, including, for example, wavelengths in the IR spectrum, or the visible spectrum, or both.

In order for the proximity module 302 to be able to sense the presence of the target 101, at least some portion of the lens 310 must permit at least some portion of the light emitted by the emitter 304 to exit the electronic device 300. Similarly, at least some portion of the lens must permit at least some portion of the light reflected by the target 301 to be detected by the detector 306. As described previously, in the prior art proximity sensor of FIGS. 1 and 2, the emitter FOV 105 and the detector FOV 107 are offset from one another and not in alignment. Thus, in order to sense the presence of an external target, the lens 110 comprises the transmissive portion 200 that extends over an area that is opposite both the emitter 104 and the detector 106. In contrast, in the first example proximity sensor of FIG. 3, an optical routing module 330 is used to redirect the detector FOV to bring it into alignment with the emitter FOV 105. This means that it is possible to restrict the application of a transmissive coating 316 to only the portion of the internal surface 309 of the lens 310 that extends over an area that is opposite the emitter 304. A non-transmissive coating 314 may be applied to the portion of the internal surface 309 of the lens 310 that extends over an area that is opposite the detector 306.

The optical routing module 330 may be positioned within the air gap 312, and may comprise a single optical element or a plurality of optical elements. In one example, the optical routing module 330 may be fabricated from a polycarbonate. In another example, the optical routing module 330 may be fabricated from PMMA having a refractive index of n=1.49. The optical routing module 330 may be configured to guide light emitted by the emitter 304 through the portion of the lens 310 that is coated with the transmissive coating 316 and aligned with the emitter FOV 305. This portion of the lens 310 will herein be referred to as "the transmissive portion". The optical routing module 330 may also be configured to guide target-reflected light collected by the transmissive portion of the lens 310 to the detector 306. In one example, the transmissive coating 316 may comprise one or more layers or printings of IR transmissible ink that preferentially transmits light in the IR spectrum over light in the visible spectrum. For example, the transmissive coating 316 may be 5% transmissible in the visible range, and 95% transmissible in the IR range. Although not explicitly illustrated, as an alternative to the transmissive portion of the lens being defined by the application of the transmissive coating 316, the transmissive portion may be defined by the absence of any coatings or printings. In another example, where the light emitted by the emitter 304 has a wavelength in the visible spectrum, it is contemplated that the transmissive portion of the lens 310 could be defined by an optical notch filter.

In the example of FIG. 3, the optical routing module 330 is illustrated as a structure having a substantially parallelepiped shape. The optical routing module 330 may comprise one or more optical elements.

Although not explicitly illustrated, the optical routing module 330 may be secured within the air gap 312 using a variety of means. In one example, the optical routing module 330 is secured by the surrounding housing (not shown) of the electronic device 300. In another example, the optical routing module 330 is secured directly to the proximity module 302, for example, using an optically clear adhesive.

In operation, the emitter 304 emits a light beam 318 within the emitter FOV 305. The light beam 318 may be incident on a transmissive-reflective surface 322 of the optical routing module 330, where the transmissive-reflective surface 322 is a flat, smooth surface oriented at an angle of approximately 45°±10° with respect to the emitter FOV 305. The optical routing module 330 may then guide the light beam 318 transmitted by the transmissive-reflective surface 322 through the transmissive portion of the lens 310 to the exterior of the electronic device 300, where the transmissive portion is in alignment with the emitter FOV 305. In this case, guiding the light beam 318 through the transmissive portion comprises transmitting the light beam 318 through a first transmissive surface 324 that is located opposite the transmissive portion. Responsive to the incidence of the light beam 318 on the target 101, a light beam 320 may be reflected by the target 101 in such a manner that it is collected by the transmissive portion of the lens 310. The optical routing module 330 guides the light beam 320 to the detector 306 by internally reflecting the light beam 320 using the transmissive-reflective surface 322. In this case, guiding the light beam 320 to the detector 306 comprises transmitting the light beam 320 through the first transmissive surface 324 prior to reflecting the light beam 320 off of the transmissive-reflective surface 322. Guiding the light beam 320 to the detector 306 also comprises, subsequently to reflecting the light beam 320 using the transmissive-reflective surface 322, further internally reflecting the light beam 320 off of a reflective surface 326 of the optical routing module 330, where the reflective surface 326 is a flat, smooth surface in alignment with the FOV of the detector 306 and oriented at an angle of approximately 45°±10° with respect to the FOV of the detector 306. The reflective surface 326 and the transmissive-reflective surface 322 may be substantially coplanar and may correspond to opposing faces of the substantially parallelepiped shaped structure. As will be further described with respect to FIG. 5, the guiding of the internally reflected light from the transmissive-reflective surface 322 toward the reflective surface 326 may be understood to include the transmission of the light through a plurality of intermediate optical elements and/or surfaces. Upon incidence at the reflective surface 326, the light beam 320 may again be internally reflected and guided by the optical routing module 330 out of a second transmissive surface 328 that is opposite the detector 306, such that the light beam 320 is incident on the detector 306 within the detector FOV.

Responsive to detecting the light beam 320, the proximity module 302 may generate a signal indicative of the presence of a target proximal to the lens 310 or of the proximity of a target relative to the lens 310, that is, a signal indicative of how close the target is to the lens 310. As described previously with respect to the proximity module 102, such a signal may take a variety of different forms. In one example, the signal is an analog signal having an amplitude or a frequency that is dependent on the presence of the target or the proximity of the target or both. For example, the analog signal may alternate between a maximum amplitude and a minimum amplitude, depending on whether or not a target is detected. Alternatively, the amplitude of the analog signal may increase as the intensity of the light detected by the detector 306 increases in response to an increase in the proximity of the target to the lens 310. In another example, the proximity module 302 may comprise an analog-to-digital converter, such that the signal output by proximity module 302 is a digital signal having a value that is dependent on the presence of the target or the proximity of the target or both. Alternatively, where the signal output by the proximity module 302 is analog, the electronic device 300 may comprise a separate analog-to-digital converter that subsequently performs digital conversion on the output analog signal.

Depending on the signal generated by the proximity module 302, the electronic device 300 may modify one or more of its behaviours or processes. in the event that an analog signal generated by the proximity module 302 switches from a minimum amplitude to a maximum amplitude, where the maximum amplitude is indicative of the presence of a target proximal to the lens 310, a processor of the electronic device 300 may be configured to deactivate a touch screen (not shown) of the electronic device 300.

Figure 4:
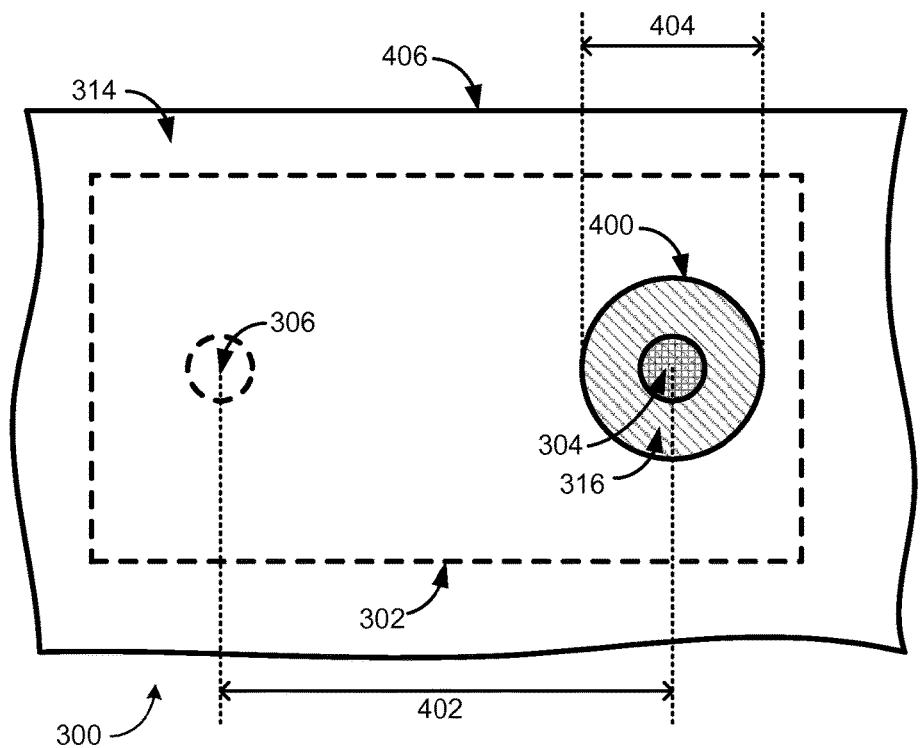
FIG. 4 is a schematic top plan view of a portion of the electronic device illustrated in FIG. 3.

FIG. 4 is a schematic top plan view of a portion of the electronic device 300. In contrast to FIG. 2, only the portion of the internal surface 309 of the lens 310 that extends over an area that is opposite the emitter 304 is coated in the transmissive coating 316. This transmissive portion or transmissive aperture 400 permits at least some portion of the light emitted by the emitter 304 to be transmitted to the exterior of the electronic device 300, and permits at least some portion of the target-reflected light to be transmitted to the interior of the electronic device 300, for detection by the detector 306. Other portions of the internal surface 309 of the lens 310 that do not correspond to the transmissive portion 400 may be coated in the non-transmissive coating 314. That is, the non-transmissive coating 314 may be applied to a portion of the internal surface 309 that extends over an area that is not opposite the emitter 104. In contrast to the prior art proximity sensor, this includes the application of the non-transmissive coating 314 over an area that is opposite the detector 306. As previously described, the application of the non-transmissive coating 314 may provide the electronic device 300 with the overall appearance of a particular colour, such as black or white. The portion of the internal surface 309 to which the non-transmissive coating 314 is applied, defined as the non-transmissive portion 406, may limit or prevent the transmission of light, including light emitted by the emitter 304, target-reflected light and external ambient light. The transmissive portion 400 of the lens 310 may be bounded by the non-transmissive portion 406 of the lens 310.

As illustrated in the example of FIG. 4, the transmissive portion 400 is an aperture having a substantially circular shape that extends over an area that is opposite the emitter 304 only, and not the detector 306. In one example, where the emitter 304 and the detector 306 are separated by a distance 402 of approximately 3.32 mm, transmissive portion 400 has a diameter 404 of approximately 1.2 mm. This may be contrasted with the 5 mm-long oblong-shaped transmissive portion 200 illustrated in FIG. 2.

There are notable advantages of the first example proximity sensor illustrated in FIG. 3 over the prior art proximity sensor illustrated in FIG. 1. Firstly, the transmissive portion 400 of the first example proximity sensor is significantly smaller than the transmissive portion 200 of the prior art proximity sensor. This smaller sized transmissive portion 400 may result in an electronic device 300 that is more aesthetically appealing, especially when there is a significant visual contrast between the appearance of the transmissive portion 400 and the non-transmissive portion 406. Secondly, by employing the optical routing module 330 and the single transmissive portion 400 opposite the emitter 304 only, the detector FOV becomes aligned with the emitter FOV 305. This means that, in contrast to the prior art proximity sensor of FIG. 1, there is no blind zone to account for. Accordingly, even a target that is very close to the external surface 311 of the lens 310 may still be detected using the first example proximity sensor. Thirdly, the smaller size of the transmissive portion may reduce the crosstalk between the emitter 304 and the detector 306. For example, the use of IR transmissible ink is known to produce haze or internal reflections on the order of 5% to 20%, which in turn may result in increased crosstalk between the emitter and the detector. By simultaneously reducing the portion of the lens coated in IR transmissible ink, and increasing the portion coated in non-transmissible ink, there may be a reduction in the amount of haze and an increase in the amount of light absorbed by the non-transmissible portion. This may result in less crosstalk between the emitter and the detector.

Another potential advantage of the first example proximity sensor over the prior art proximity sensor is related to the use of anti-smudge or anti-fingerprint coating on the external surface of the lens of an electronic device. Returning briefly to FIG. 1, although not explicitly illustrated, at least some portion of the external surface 111 of the lens 110 may be coated in an anti-smudge or anti-fingerprint coating. The purpose of the anti-smudge coating is to reduce the appearance of smudge marks or fingerprints on the lens 110, which may originate from oils on a user's skin. The anti-smudge coating causes the oil to form beads on the external surface 111, which are easier to wipe away. Despite their benefits, anti-smudge coatings may have a detrimental impact on the performance of prior art proximity sensors, such as the proximity sensor illustrated in FIG. 1. This is because the spherical shape of the oil beads formed on the anti-smudge coating may result in an increase in the internal reflection of emitter light, thereby diluting any signal arising from the presence of an external target. For this reason, it has previously been of interest to avoid applying the anti-smudge coating to the portion of the external surface 109 of the lens 110 that is opposite proximity module 102. That is, the majority of the lens 110 may be treated with the anti-smudge coating, while the portion corresponding to the transmissive aperture 200 may remain untreated. While this has been known to improve the performance of the prior art proximity sensor, it incurs an additional cost during manufacturing, because instead of applying the anti-smudge coating to the entire lens 110, a mask may be used to block application of the anti-smudge coating over the transmissive aperture 200. An advantage of the first example proximity sensor illustrated in FIGS. 3 and 4 is that the entire external surface 311 of the lens 310, including the transmissive aperture 400, may be treated with an anti-smudge coating without any detrimental impact on the performance of the proximity sensor. Due to the smaller size of the transmissive aperture 400, the light ultimately reaching the external surface 309 of the lens 310 may be incident on the oil beads at an angle that is more normal to the external surface 309 than would be the case with a larger aperture. The more normal the angle of incidence on an oil bead, the less internal reflection of the light, and ultimately, the less crosstalk. Thus, in contrast to the known benefit of leaving the larger transmissive aperture 200 untreated with the anti-smudge coating, there may in fact be no significant benefit to leaving the smaller transmissive aperture 400 untreated with the anti-smudge coating. Accordingly, the costs associated with masking during manufacturing could be saved.

Figure 5:
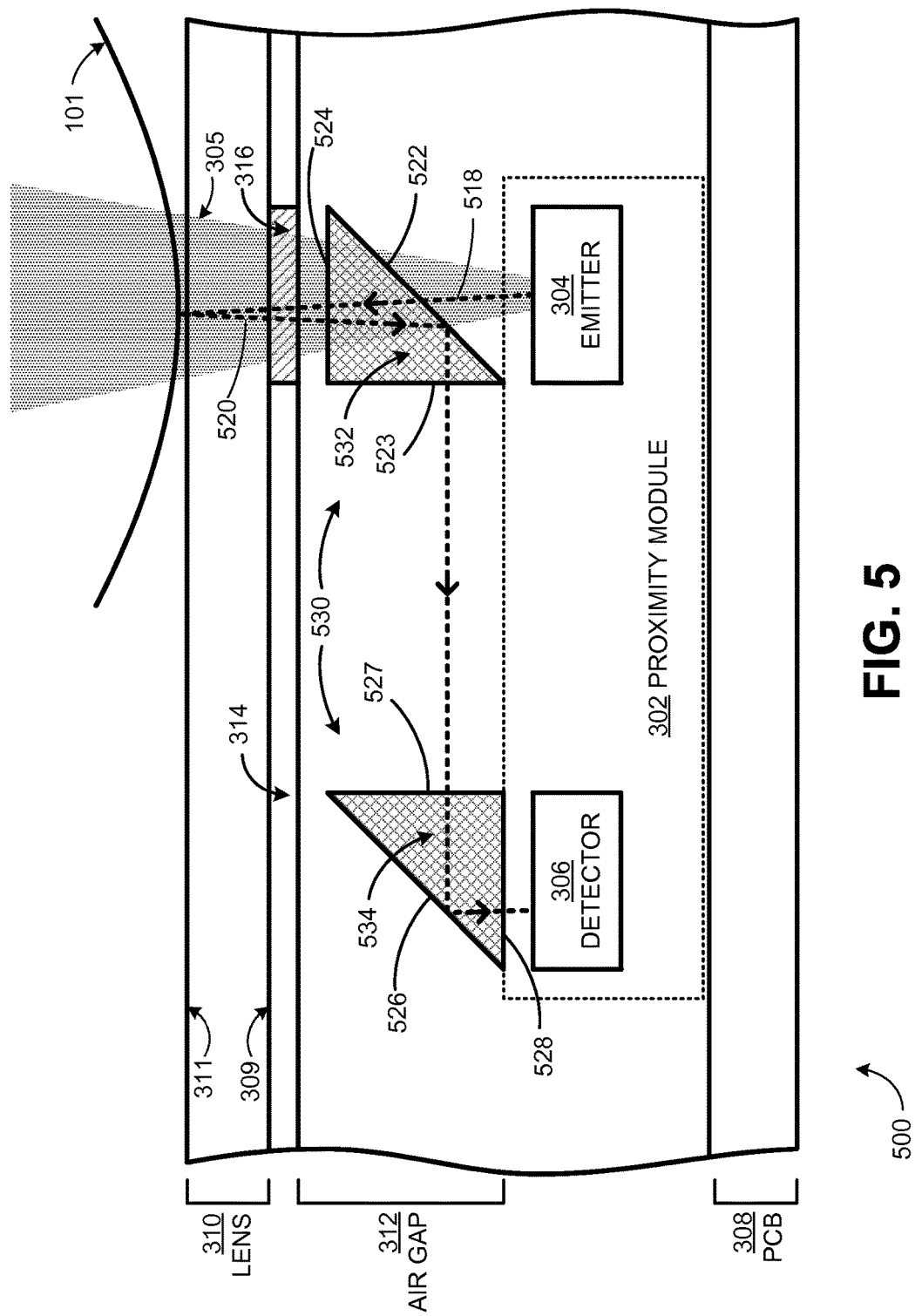
FIG. 5 is a schematic cross-sectional view of a portion of an electronic device comprising a second example proximity sensor.

As noted previously, the optical routing module may comprise a single optical element or a plurality of optical elements. With reference to FIG. 5, the operation of a second example proximity sensor comprising an optical routing module having a plurality of optical elements will be described.

FIG. 5 illustrates a schematic cross-sectional view of a portion of an electronic device 500 comprising the proximity module 302. When referring to the example of FIG. 5, the combination of the proximity module 302 and any optical elements involved in the transmission of light between the proximity module 302 and the target 101 to be sensed will herein be referred to the "second example proximity sensor".

The proximity module 302 is as described with respect to FIG. 3, and is affixed to the PCB 308 of the electronic device 500. Similarly to the electronic device 300, the electronic device 500 comprises the lens 310 having the internal surface 309 that faces the internal components of the electronic device 500, and the external surface 311 that is exposed to the exterior of the electronic device 500. The lens 310 may be separated from the proximity module 302 by the air gap 312.

As described with respect to the electronic device 300, the non-transmissive coating 314 and the transmissive coating 316 are applied to the internal surface 309 of the lens 310, with the transmissive coating 316 being applied to only the portion of the internal surface 309 of the lens 310 that extends over an area that is opposite the emitter 304. The non-transmissive coating 314 may be applied to the portion of the internal surface 309 of the lens 310 that extends over an area that is opposite the detector 306.

In place of the optical routing module 330 of FIG. 3, the second example proximity sensor of FIG. 5 comprises an optical routing module 530 which is positioned within the air gap 312. Similarly to the optical routing module 330, the optical routing module 530 may be configured to guide light emitted by the emitter 304 through the portion of the lens 310 that is coated with the transmissive coating 316 and aligned with the emitter FOV 305. The optical routing module 530 may also be configured to guide target-reflected light collected by the transmissive portion of the lens 310 to the detector 306.

In the example illustrated in FIG. 5, the optical routing module 530 comprises two wedge-shaped optical elements 532 and 534. In one example, the wedge-shaped optical elements 532 and 534 are fabricated from PMMA. In another example, the wedge-shaped optical elements 532 and 534 are fabricated from a polycarbonate.

Although not explicitly illustrated, the wedge-shaped elements 532 and 534 may be secured within the air gap 312 using a variety of means. In one example, the wedge-shaped elements 532 and 534 are secured by the surrounding housing of the electronic device 500. In another example, the wedge-shaped elements 532 and 534 are secured directly to the proximity module 502, for example, using an optically clear adhesive.

In operation, the emitter 304 emits a light beam 518 within the emitter FOV 305. The light beam 518 may be incident on a transmissive-reflective surface 522 of the wedge-shaped element 532, where the transmissive-reflective surface 522 is a flat, smooth surface oriented at an angle of approximately 45°±10° with respect to the emitter FOV 305. The wedge-shaped element 532 may then guide the light beam 518 out of a first transmissive surface 524 that is opposite the transmissive portion of the lens 310, such that the light beam 518 is transmitted to the exterior of the electronic device 500. Responsive to the incidence of the light beam 518 on the target 101, a light beam 520 may be reflected by the target 101 in such a manner that it is transmitted back through the transmissive portion of the lens 310 and is incident on the first transmissive surface 524 of the wedge-shaped element 532. Within the wedge-shaped element 532, the light beam 520 may be internally reflected off of the transmissive-reflective surface 522 and guided out of an inter-element transmissive surface 523 of the wedge-shaped element 532 toward an inter-element transmissive surface 527 of the wedge-shaped element 534, where the inter-element transmissive surfaces 523 and 527 are substantially coplanar and separated by some distance, for example, a distance of between 2 mm and 5 mm. Upon incidence at the inter-element transmissive surface 527 of the wedge-shaped element 534, the light beam 520 may again be internally reflected off of a reflective surface 526 of the wedge-shaped element 534, where the reflective surface 526 is a flat, smooth surface oriented at an angle of approximately 45°±10° with respect to the FOV of the detector 306. The reflective surface 526 and the transmissive-reflective surface 522 may be substantially coplanar. The light beam 520 may then be guided by the wedge-shaped element 534 out of a second transmissive surface 528 that is opposite the detector 306, such that the light beam 520 is incident on the detector 306 within the detector FOV. Responsive to detecting the light beam 520, the proximity module 302 may generate a signal indicative of the presence of a target proximal to the lens 310. Responsive to the signal generated by the proximity module 302, the electronic device 500 may modify one or more of its behaviours or processes. For example, a touch screen (not shown) of the electronic device 500 may become deactivated.

Although not explicitly illustrated, a top plan view of the electronic device 500 may be similar to the view illustrated in FIG. 4. For example, the portion of the internal surface 309 of the lens 310 that is coated by the transmissive coating 316 in FIG. 5 may be represented by the transmissive aperture 400 illustrated in FIG. 4.

The second example proximity sensor of FIG. 5 may possess the same advantages as the first example proximity sensor of FIG. 3. For example, the second example proximity sensor permits the use of a smaller sized transmissive portion that only extends over the area is opposite the emitter 304. As previously described, this may result in an electronic device that is more aesthetically appealing. Further, by aligning the FOV of the detector 306 with the emitter FOV 305, also it may be possible to eliminate the blind zone present in prior art proximity sensors. In addition, the second example proximity sensor may exhibit reduced crosstalk relative to prior art proximity sensors, and may also reduce costs associated with the application of anti-smudge coating.

In addition to the first example proximity sensor of FIG. 3 and the second example proximity sensor of FIG. 5, additional examples are contemplated.

Figure 6:
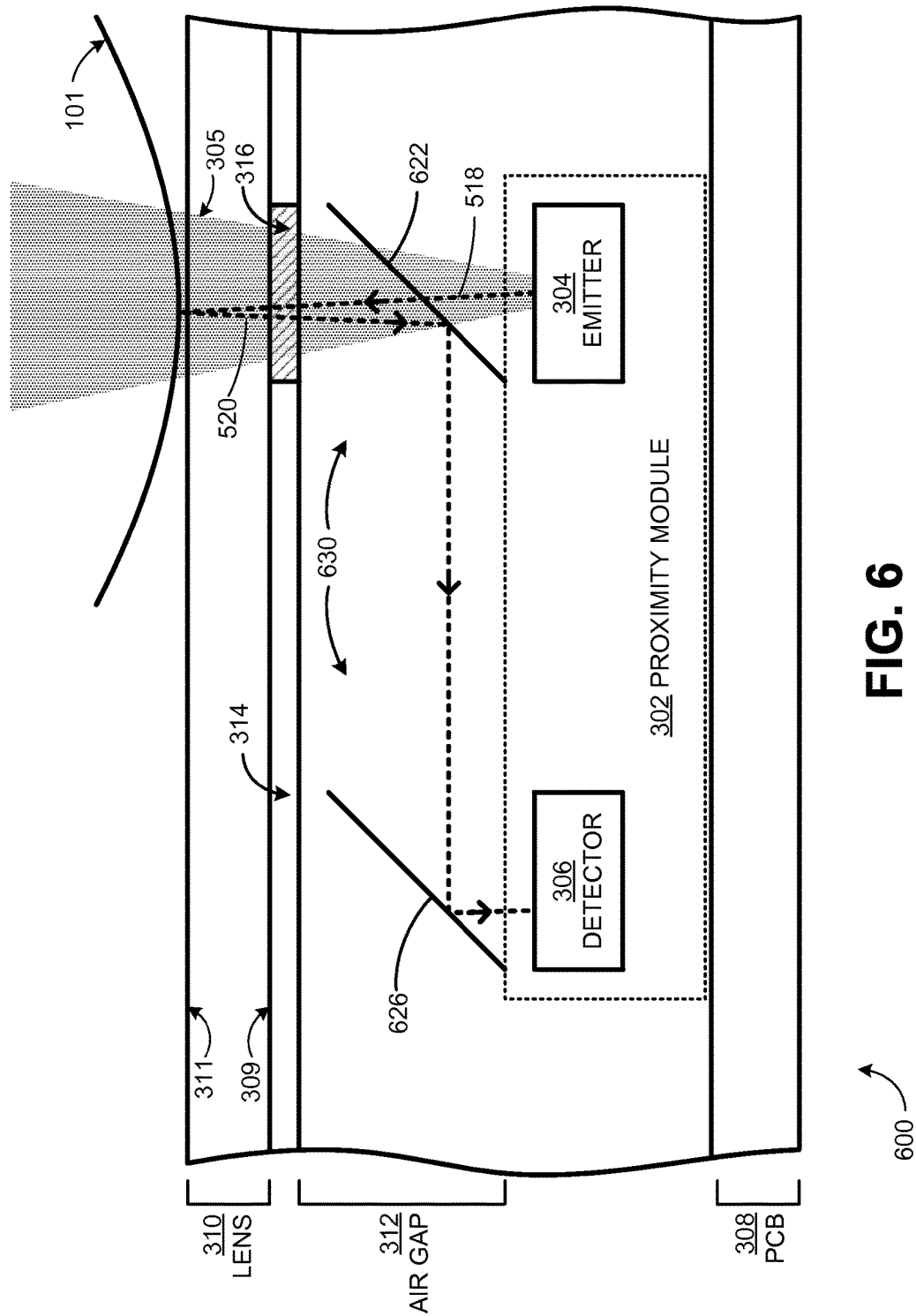
FIG. 6 is a schematic cross-sectional view of a portion of an electronic device comprising a third example proximity sensor.

FIG. 6 illustrates a schematic cross-sectional view of a portion of an electronic device 600 comprising the proximity module 302. When referring to the example of FIG. 6, the combination of the proximity module 302 and any optical elements involved in the transmission of light between the proximity module 302 and the target 101 to be sensed will herein be referred to the "third example proximity sensor".

Certain features of the electronic device 600, such as the proximity module 302 and the lens 310, may be as described with respect to FIG. 5. However, in place of the optical routing module 530, the third example proximity sensor of FIG. 6 comprises an optical routing module 630.

The optical routing module 630 may behave similarly to the optical routing module 530, but, in place of the wedge-shaped optical elements 532 and 534, the optical routing module 630 comprises substantially flat optical elements 622 and 626, respectively. The optical element 622 corresponds to the transmissive-reflective surface 522 of the wedge-shaped element 532, while the optical element 626 corresponds to the reflective surface 526 of the wedge-shaped element 534. The transmissive-reflective optical element 622 is in alignment with the emitter FOV 305, with the FOV of the detector 306, and with the transmissive portion of the lens 310. The transmissive-reflective optical element 622 is oriented at an angle of approximately 45°±10° with respect to the emitter FOV 305. The reflective optical element 626 is substantially coplanar with the transmissive-reflective optical element 622 and is in alignment with the FOV of the detector 306. The reflective optical element 626 is oriented at an angle of approximately 45°±10° with respect to the FOV of the detector 306. The optical routing module 630 is configured to guide the emitted light transmitted by the transmissive-reflective optical element 622 through the transmissive portion of the lens 310 to the exterior of the electronic device 600. The optical routing module 630 is also configured to guide the target-reflected light collected by the transmissive portion of the lens 310 to the detector 306 by reflecting the target-reflected light using the transmissive-reflective optical element 622. The optical routing module 630 is further configured to guide the target-reflected light, previously reflected by the transmissive-reflective optical element 622, to the detector 306 by subsequently reflecting the target-reflected light off of the reflective optical element 626.

Figure 7:
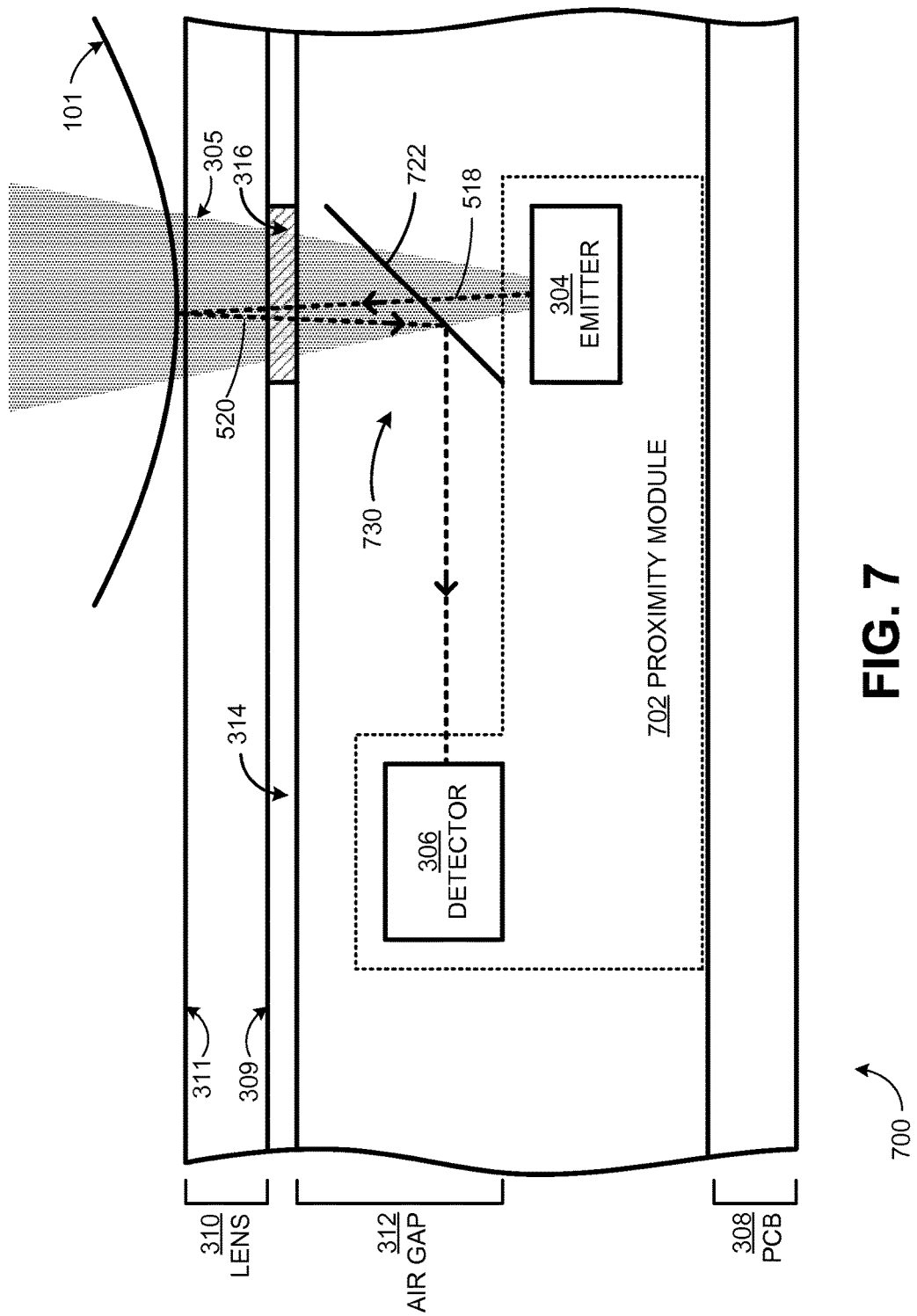
FIG. 7 is a schematic cross-sectional view of a portion of an electronic device comprising a fourth example proximity sensor.

In another example, FIG. 7 illustrates a schematic cross-sectional view of a portion of an electronic device 700 comprising a proximity module 702. When referring to the example of FIG. 7, the combination of the proximity module 702 and any optical elements involved in the transmission of light between the proximity module 702 and the target 101 to be sensed will herein be referred to the "fourth example proximity sensor".

Certain features of the electronic device 700, such as the lens 310, may be as described with respect to FIG. 6. However, in place of the proximity module 302 and the optical routing module 630, the fourth example proximity sensor of FIG. 7 comprises a proximity module 702 and an optical routing module 730, respectively.

Similarly to the proximity module 302, the proximity module 702 comprises an emitter 304 and a detector 306. However, in this case, the detector 306 and the FOV thereof are rotated clockwise by 90 degrees relative to their orientation in the proximity module 302.

Similarly to the optical routing module 630, the optical routing module 730 comprises a transmissive-reflective optical element, denoted 722, which is in alignment with the emitter FOV 305, with the FOV of the detector 306, and with the transmissive portion of the lens 310. The transmissive-reflective optical element 722 is oriented at an angle of approximately 45°±10° with respect to the emitter FOV 305. The optical routing module 730 is configured to guide the emitted light transmitted by the transmissive-reflective optical element 722 through the transmissive portion of the lens 310 to the exterior of the electronic device 700. The optical routing module 730 is also configured to guide the target-reflected light collected by the transmissive portion of the lens 310 to the detector 306 by reflecting the target-reflected light using the transmissive-reflective optical element 722. In contrast to the third example proximity sensor of FIG. 6, the modified orientation of the detector 306 in the fourth example proximity sensor of FIG. 7 may enable the use of an optical routing module 730 that does not include an element corresponding to the reflective optical element 626.

Figure 8:
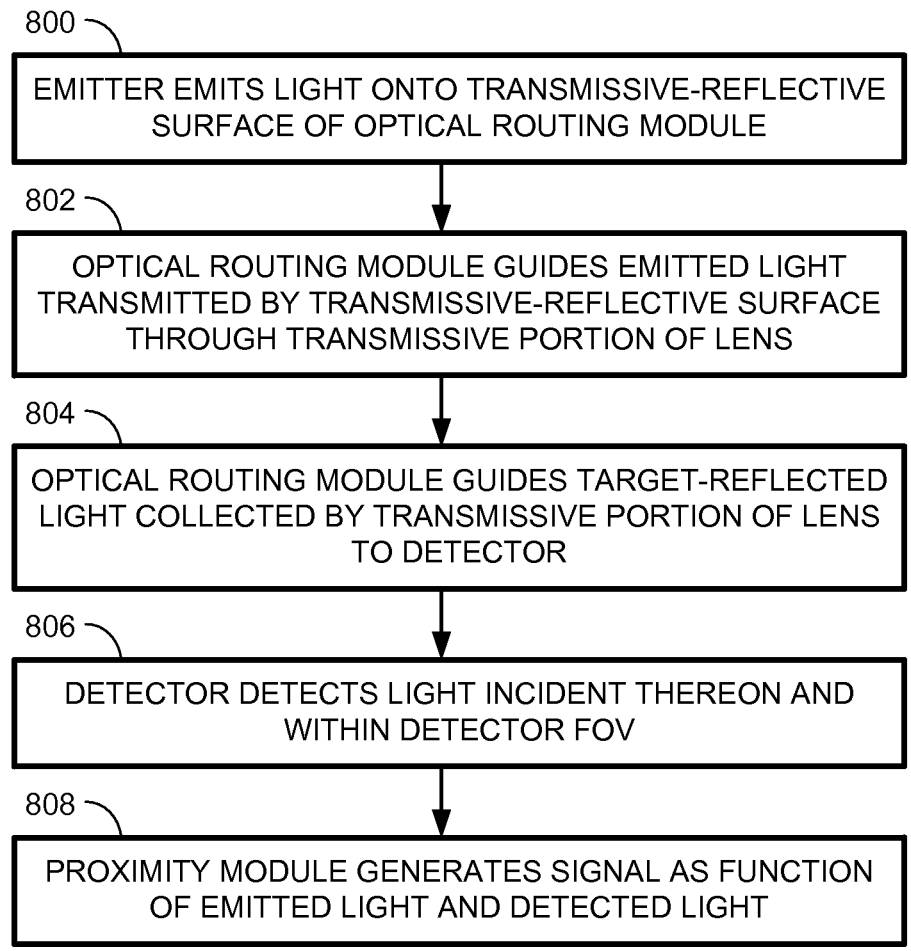
FIG. 8 is an example method for an electronic device comprising a proximity sensor.

FIG. 8 illustrates an example method for a proximity sensor in an electronic device, such as the electronic device 300, 500, 600 or 700.

At 800, an emitter of a proximity module emits light onto a transmissive-reflective surface of an optical routing module, where the transmissive-reflective surface is in alignment with a FOV of the emitter and with a FOV of a detector of the proximity module, and where the transmissive-reflective surface is oriented at an angle of approximately 45°±10° with respect to the emitter FOV. For example, the emitter 304 of the proximity module 302 may emit light onto the transmissive-reflective surface 322 of the optical routing module 330, or onto the transmissive-reflective surface 522 of the optical routing module 530, or onto the transmissive-reflective optical element 622 of the optical routing module 630. In another example, the emitter 304 of the proximity module 702 may emit light onto the transmissive-reflective optical element 722 of the optical routing module 730.

At 802, the optical routing module guides the emitted light transmitted by the transmissive-reflective surface through a transmissive portion of a lens to the exterior of the electronic device, where the transmissive portion is in alignment with the emitter FOV. For example, the optical routing module 330, 530, 630 or 730 may guide the emitted light transmitted by the transmissive-reflective surface 322 or 522, or by the transmissive-reflective optical element 622 or 722, through the transmissive portion 400 of the lens 310. Optionally, guiding the emitted light through the transmissive portion may comprise transmitting the emitted light through a first transmissive surface of the optical routing module that is located opposite the transmissive portion. Examples of the first transmissive surface include the transmissive surfaces 324 and 524.

At 804, the optical routing module guides target-reflected light collected by the transmissive portion of the lens to the detector by reflecting the target-reflected light using the transmissive-reflective surface. The target-reflected light is light that has been reflected by a target external to the electronic device, such as the target 101. Where the optical routing module includes the first transmissive surface, such as the transmissive surface 324 or 524, guiding the target-reflected light to the detector may comprise transmitting the target-reflected light through the first transmissive surface prior to reflecting the target-reflected light using the transmissive-reflective surface. Optionally, guiding the target-reflected light to the detector comprises, subsequently to reflecting the target-reflected light using the transmissive-reflective surface, further reflecting the target-reflected light off of a reflective surface of the optical routing module, where the reflective surface is substantially coplanar with the transmissive-reflective surface, is in alignment with the detector FOV, and is oriented at an angle of approximately 45°±10° with respect to the detector FOV. Examples of the reflective surface include reflective surfaces 326 and 526, and the reflective optical element 626. Optionally, guiding the target-reflected light to the detector may comprise transmitting the target-reflected light through one or more additional surfaces of the optical routing module. For example, the target-reflected light may be transmitted through one or more of: a second transmissive surface, such as the transmissive surface 328 or 528, located opposite the detector; and one or more inter-element surfaces, such as the surfaces 523 and 527.

At 806, the detector detects the target-reflected light that is incident on the detector within the detector FOV, and the proximity module generates a signal as a function of the detected light and the emitted light. Responsive to the signal generated by the proximity module, the electronic device may modify one or more of its behaviours. For example, a touch screen (not shown) of the electronic device may become deactivated.

What is claimed is:

1. A proximity sensor for an electronic device, the proximity sensor comprising:
   a proximity module having an emitter to emit light in an emitter field of view (FOV) and a detector to detect light in a detector FOV, the proximity module configured to generate a signal that is a function of the emitted light and of the light incident on the detector in the detector FOV, wherein the signal is indicative of the presence of a target external to the electronic device;
   a lens separated from the proximity module by an air gap, the lens having (i) a transmissive portion in alignment with the emitter FOV and with the detector FOV, and (ii) a non-transmissive portion that extends over an area that is opposite the detector; and
   an optical routing module secured within the air gap, the optical routing module comprising a transmissive-reflective surface in alignment with the emitter FOV, with the detector FOV, and with the transmissive portion of the lens, wherein the transmissive-reflective surface is oriented at an angle of approximately 45°±10° with respect to the emitter FOV, and wherein the optical routing module is configured:
      to guide the emitted light transmitted by the transmissive-reflective surface through the transmissive portion of the lens to the exterior of the electronic device; and
      to guide target-reflected light collected by the transmissive portion of the lens to the detector by reflecting the target-reflected light using the transmissive-reflective surface, wherein the target-reflected light has been reflected by the target external to the electronic device.

2. The proximity sensor as claimed in claim 1, wherein the optical routing module further comprises a reflective surface that is substantially coplanar with the transmissive-reflective surface and that is in alignment with the detector FOV, wherein the reflective surface is oriented at an angle of approximately 45°±10° with respect to the detector FOV, and wherein the optical routing module is further configured:
  to guide the target-reflected light, previously reflected by the transmissive-reflective surface, to the detector by subsequently reflecting the target-reflected light off of the reflective surface.

3. The proximity sensor as claimed in claim 2, wherein the transmissive-reflective surface and the reflective surface correspond to opposing faces of a substantially parallelepiped shaped structure comprising one or more optical elements.

4. The proximity sensor as claimed in claim 2, wherein the transmissive-reflective surface of the optical routing module corresponds to a face of a first wedge-shaped element, wherein the reflective surface of the optical routing module corresponds to a face of a second wedge-shaped element, and wherein the first wedge-shaped element and the second wedge-shaped element are separated by a distance.

5. The proximity sensor as claimed in claim 1, wherein the emitter is a laser and the emitter FOV is between 2° and 25°.

6. The proximity sensor as claimed in claim 1, wherein the transmissive portion comprises an aperture that is bounded by the non-transmissive portion, the aperture having a diameter of approximately 1.2 mm.

7. The proximity sensor as claimed in claim 1, wherein both the transmissive portion of the lens and the non-transmissive portion of the lens are treated with an anti-smudge coating.

8. The proximity sensor as claimed in claim 1, wherein the transmissive portion is defined by the portion of the lens to which a transmissive coating is applied, the transmissive coating comprising one or more layers or printings of IR-transmissible ink that preferentially transmit light in the IR spectrum over light in the visible spectrum.

9. The proximity sensor as claimed in claim 1, wherein the non-transmissive portion is defined by the portion of the lens to which a non-transmissive coating is applied, the non-transmissive coating comprising one or more layers or printings of non-transmissible ink that limit or prevent the transmission of the emitted light.

10. The proximity sensor as claimed in claim 1, wherein the optical routing module is fabricated from a polycarbonate or from poly(methyl methacrylate) (PMMA).

11. An electronic device comprising:
  a housing;
  a host processor enclosed within the housing; and
  a proximity sensor coupled to the host processor, the proximity sensor comprising:
    a proximity module having an emitter to emit light in an emitter field of view (FOV) and a detector to detect light in a detector FOV, the proximity module configured to generate a signal that is a function of the emitted light and of the light incident on the detector in the detector FOV, wherein the signal is indicative of the presence of a target external to the electronic device;
    a lens separated from the proximity module by an air gap, the lens having (i) a transmissive portion in alignment with the emitter FOV and with the detector FOV, and (ii) a non-transmissive portion that extends over an area that is opposite the detector; and
    an optical routing module secured within the air gap, the optical routing module comprising a transmissive-reflective surface in alignment with the emitter FOV, with the detector FOV, and with the transmissive portion of the lens, wherein the transmissive-reflective surface is oriented at an angle of approximately 45°±10° with respect to the emitter FOV, and wherein the optical routing module is configured:
      to guide the emitted light transmitted by the transmissive-reflective surface through the transmissive portion of the lens to the exterior of the electronic device; and
      to guide target-reflected light collected by the transmissive portion of the lens to the detector by reflecting the target-reflected light using the transmissive-reflective surface, wherein the target-reflected light has been reflected by the target external to the electronic device.

12. The electronic device as claimed in claim 11, wherein the optical routing module further comprises a reflective surface that is substantially coplanar with the transmissive-reflective surface and that is in alignment with the detector FOV, wherein the reflective surface is oriented at an angle of approximately 45°±10° with respect to the detector FOV, and wherein the optical routing module is further configured:
  to guide the target-reflected light, previously reflected by the transmissive-reflective surface, to the detector by subsequently reflecting the target-reflected light off of the reflective surface.

13. The electronic device as claimed in claim 12, wherein the transmissive-reflective surface and the reflective surface correspond to opposing faces of a substantially parallelepiped shaped structure comprising one or more optical elements.

14. The electronic device as claimed in claim 12, wherein the transmissive-reflective surface of the optical routing module corresponds to a face of a first wedge-shaped element, wherein the reflective surface of the optical routing module corresponds to a face of a second wedge-shaped element, and wherein the first wedge-shaped element and the second wedge-shaped element are separated by a distance.

15. The electronic device as claimed in claim 11, wherein the emitter is a laser and the emitter FOV is between 2° and 25°.

16. The electronic device as claimed in claim 11, wherein the transmissive portion comprises an aperture that is bounded by the non-transmissive portion, the aperture having a diameter of approximately 1.2 mm.

17. The electronic device as claimed in claim 11, wherein both the transmissive portion of the lens and the non-transmissive portion of the lens are treated with an anti-smudge coating.

18. The electronic device as claimed in claim 11, wherein the transmissive portion is defined by the portion of the lens to which a transmissive coating is applied, the transmissive coating comprising one or more layers or printings of IR-transmissible ink that preferentially transmit light in the IR spectrum over light in the visible spectrum.

19. The electronic device as claimed in claim 11, wherein the non-transmissive portion is defined by the portion of the lens to which a non-transmissive coating is applied, the non-transmissive coating comprising one or more layers or printings of non-transmissible ink that limit or prevent the transmission of the emitted light.

20. The electronic device as claimed in claim 11, wherein the optical routing module is fabricated from a polycarbonate or from poly(methyl methacrylate) (PMMA).

21. The electronic device as claimed in claim 11, further comprising a touch screen coupled to the host processor.

22. A method implemented in an electronic device comprising a proximity sensor, wherein the proximity sensor comprises (i) a proximity module having an emitter to emit light in an emitter field of view (FOV) and a detector to detect light in a detector FOV, (ii) a lens separated from the proximity module by an air gap, and (iii) an optical routing module secured within the air gap, the method comprising:

emitting light from the emitter onto a transmissive-reflective surface of the optical routing module, wherein the transmissive-reflective surface is in alignment with the emitter FOV and with the detector FOV, and wherein the transmissive-reflective surface is oriented at an angle of approximately 45°±10° with respect to the emitter FOV;

guiding the emitted light transmitted by the transmissive-reflective surface to the exterior of the electronic device through a transmissive portion of the lens, wherein the transmissive portion is in alignment with the emitter FOV and with the detector FOV, and wherein the lens further comprises a non-transmissive portion that extends over an area that is opposite the detector;

guiding target-reflected light received collected by the transmissive portion of the lens to the detector by reflecting the target-reflected light using the transmissive-reflective surface, wherein the target-reflected light has been reflected by a target external to the electronic device;

detecting the target-reflected light incident on the detector within the detector FOV; and generating, at the proximity module, a signal indicative of the presence of the target, wherein the signal is a function of the emitted light and the detected light.

23. The method as claimed in claim 22, further comprising:

guiding the target-reflected light to the detector by reflecting the target-reflected light off of a reflective surface that is substantially coplanar with the transmissive-reflective surface and that is in alignment with the detector FOV, wherein the reflective surface is oriented at an angle of approximately 45°±10° with respect to the detector FOV.

24. The method as claimed in claim 23, wherein guiding the emitted light comprises transmitting the emitted light through a first transmissive surface of the optical routing module that is located opposite the transmissive aperture, and wherein guiding the target-reflected light further comprises transmitting the target-reflected light through the first transmissive surface and subsequently through a second transmissive surface of the optical routing module that is located opposite the detector.

25. The method as claimed in claim 22, further comprising:

treating both the transmissive portion of the lens and the non-transmissive portion of the lens with an anti-smudge coating.

\* \* \* \* \*